United States Patent [19]
Kiyohara

[11] Patent Number: 5,327,503
[45] Date of Patent: Jul. 5, 1994

[54] IMAGE INPUTTING EQUIPMENT

[75] Inventor: Toshimi Kiyohara, Nara, Japan

[73] Assignee: Sharp Kabushiki Kaisha, Osaka, Japan

[21] Appl. No.: 824,098

[22] Filed: Jan. 22, 1992

[30] Foreign Application Priority Data

Jan. 31, 1991 [JP] Japan .................................. 3-010685

[51] Int. Cl.$^5$ ............................................. G06K 7/00
[52] U.S. Cl. ..................................... 382/58; 345/104; 345/156
[58] Field of Search ............................ 382/58, 65, 67; 340/702, 705, 734, 758, 765, 784, 706, 710; 345/104, 113, 116, 141, 156, 194

[56] References Cited

U.S. PATENT DOCUMENTS

| 4,684,998 | 8/1987 | Tanioka et al. ........................ 382/58 |
| 5,070,467 | 12/1991 | Tadome .............................. 340/706 |
| 5,073,770 | 12/1991 | Lowbner ............................. 340/706 |

FOREIGN PATENT DOCUMENTS

| 0271020 | 6/1988 | European Pat. Off. ........ H04N 1/21 |
| 0393509 | 10/1990 | European Pat. Off. ..... H04N 1/028 |
| 3422120A1 | 12/1984 | Fed. Rep. of Germany ......... H04N 1/028 |
| 60-141068 | 7/1985 | Japan .............................. H04N 1/04 |
| 2013062 | 1/1990 | Japan .............................. H04N 1/04 |
| 2-23753 | 2/1990 | Japan .............................. G06F 15/02 |

OTHER PUBLICATIONS

Patent Abstracts of Japan, vol. 13, No. 2, (E-700) 6 Jan. 1989 and JP-A-63 214 061 (Hitachi Ltd.) 6 Sep. 1988, Abstract.
Patent Abstracts of Japan, vol. 12, No. 108 (E-597) 1988 and JP-A-62 237 863 (NEC Corp.) 17 Oct. 1987, Abstract.

Primary Examiner—David K. Moore
Assistant Examiner—D. Richard Anderson
Attorney, Agent, or Firm—Nixon & Vanderhye

[57] ABSTRACT

An image inputting equipment wherein the images of the document are displayed on the transmission thin type display so that the images of the document may be visually superposed on the document corresponding to the images in according with the image information of the document and the positional information of the image inputting portion, and the images of the document to be displayed on the region where the image inputting portion in the transmission thin type display has already passed can be compared with real time with those of the document to be seen with the transmission of the region where the image inputting portion has not passed.

7 Claims, 6 Drawing Sheets

IMAGE INPUTTING EQUIPMENT

BACKGROUND OF THE INVENTION

The present invention generally relates to an image inputting equipment to be used in office automation apparatus for handling the images of facsimile, hand fax, personal information terminal, image reader, image recognizing apparatus, optical character reader (OCR), digital duplicating machine or the like.

Generally, an image scanner, a television camera (electronic camera) are now used as a means for converting image information into electric information. Also, an optical character reader or a bar code reader is provided for outputting figures and characters with image inputs and processing being combined with each other. They are adapted to process the read digital image data to convert them into figures and character codes, which are outputted. The conventional image inputting equipment will be described hereinafter by way of an image.scanner which can handle multivalue images.

The above described image.scanner is provided with an exposure portion for illuminating the document, a photoelectric converting portion for converting light to electricity, a document scanning portion for decomposing a document into picture elements, and so on. The image scanner is adapted to convert into electric signals with a photosensor the reflection light from the document or the brightness of the transmission light so as to output them as digital image data for each picture element. Various types of image.scanners such as a simple hand scanner, a printer mounted scanner, a facsimile type scanner, an electronic type scanner, a cylinder type scanner and a duplicator type scanner and so on are provided as such image.scanners FIG. 9 is a perspective view of a representative image reader of the above described duplicator type scanner. A reader 4 is composed of a light source 1, a lens.eye 2 and an image sensor.array 3 being integrally installed. The reader portion 4 has the light source 1, the lens array 2 and the image sensor.array 3 arranged respectively in one row, which form a so-called line scanner. Light radiated from the above described light source 1 is reflected from the surfaces of the document 5 and becomes incident into the image sensor.array 3 through the lens.array 2 so that the digital image data of one scanning line portion are read. By the parallel movement of the reader portion 4, in the arrow direction, along the document, the image information of one sheet of the document is read.

After the reading operation is effected by the above described reading portion 4, the digital image data are variably processed by a CPU (Central Processing Unit). In accordance with the digital image data, the read images are displayed on the CRT (Cathode.Ray.Tube) and/or printed by a printer.

But in the image.scanner such as the conventional duplicator type scanner or the like, the above described reader portion 4 and a display portion for a printer, CRT or the like are respectively composed as a separate unit. Since the reader portion 4 and the display portion are positioned away from each other, the comparison between the document and the reading images of the document cannot be effected with real time. Accordingly, the same document often has to be read for resolution comparison, the light, shade level adjustment, and so on.

SUMMARY OF THE INVENTION

Accordingly, the present invention has been developed with a view to substantially eliminating the above discussed drawbacks inherent in the prior art, and has for its essential object to provide an improved image inputting equipment.

Another important object of the present invention is to provide an improved image inputting equipment capable of comparison, in real time, between the document and the images of the document.

In accomplishing these and other objects, according to one preferred embodiment of the present invention, there is provided an image inputting equipment which includes an image inputting portion for scanning documents to read the image information on the above described documents, a thin transparent type display, an image display means for displaying the images of the above described document on the above described thin transparent type display in accordance with the image information on the document read by the above described image input portion, and is characterized in that a position detecting means for detecting a position on the above described thin transparent type display of the above described image input portion so as to output the positional information, the above described image inputting portion is disposed for its free sliding operation along the reverse face of the above described thin transparent type display so as to scan the document disposed opposite to the reverse face of the above described thin transparent type display, the above described image displaying means for displaying the images of the document on the above described thin transparent type display so that the images and the document corresponding to the images may be visually superposed in accordance with the positional information outputted from the above described position detecting means and the image information read by the above described image inputting portion.

When a document as an object of the image reading is disposed opposite to the reverse face of the thin transparent type display, the image input portion is slid along the reverse face of the thin transparent type display, the above described document is scanned and the image information on the above described document is read. At the same time, the position on the thin transparent type display of the above described image inputting portion is detected by the position detecting means so as to output the position information. The images of the above described document are displayed on the above described thin transparent type display so that the images and the document corresponding to the images may be visually superposed in accordance with the position information outputted from the above described position detecting means and the image information read by the above described picture inputting portion, by the image displaying means.

The images of the document scanned, read already by the image input portion are displayed on the above described thin transparent type display so that they may be superposed on the document corresponding to the images. The unscanned portions of the above described document can be seen through the transmission of the location where the images are not displayed yet on the above described thin transparent type display.

As the result, the simultaneous comparing operation between the document and the images of the document may be effected so that the images may be easily checked, corrected.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
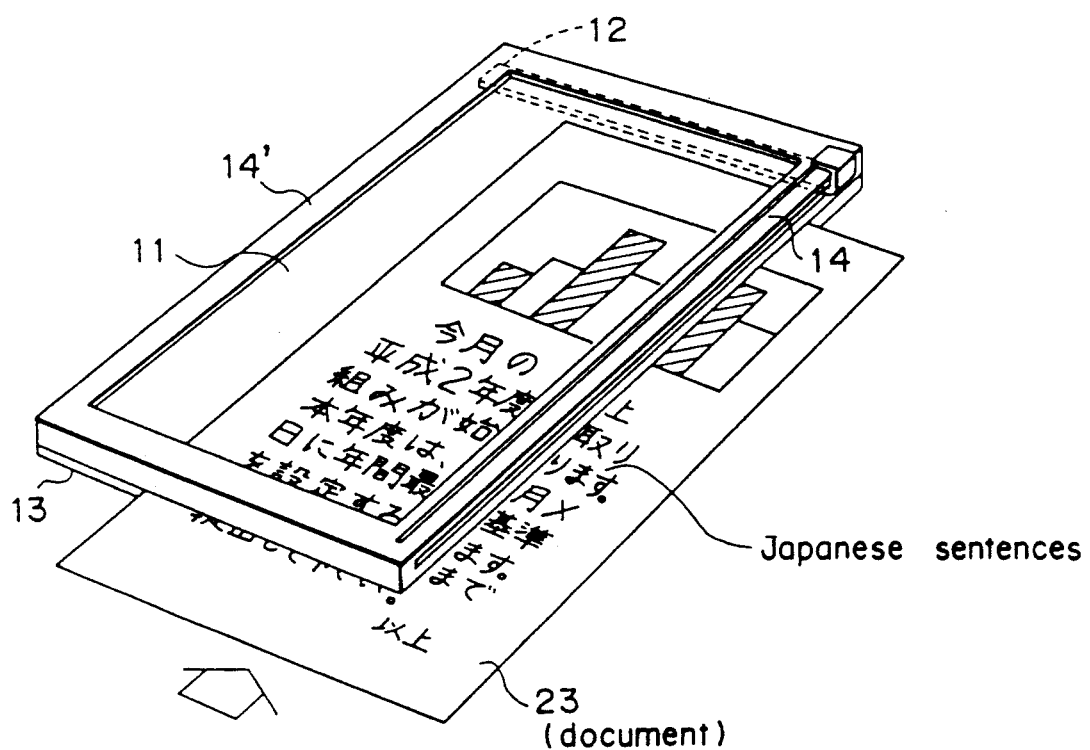
FIG. 1 is an outer appearance view in one embodiment of an image inputting apparatus of the present invention.

Before the description of the present invention proceeds, it is to be noted that like parts are designated by like reference numerals throughout the accompanying drawings.

Referring now to the drawings, there is shown in FIG. 1, an outer appearance view of an image inputting equipment in the present embodiment. In the present embodiment, an A4 size of tablet shaped image inputting equipment will be described hereinafter by way of example. The image inputting equipment is roughly composed of a thin transparent type display 11, an image inputting portion 12 mounted for its sliding operation on the reverse face of the thin transparent type display 11, a background cover 13 mounted for its free opening, closing operations on one side with a hinge on the above described thin transparent type display 11.

Figure 2:
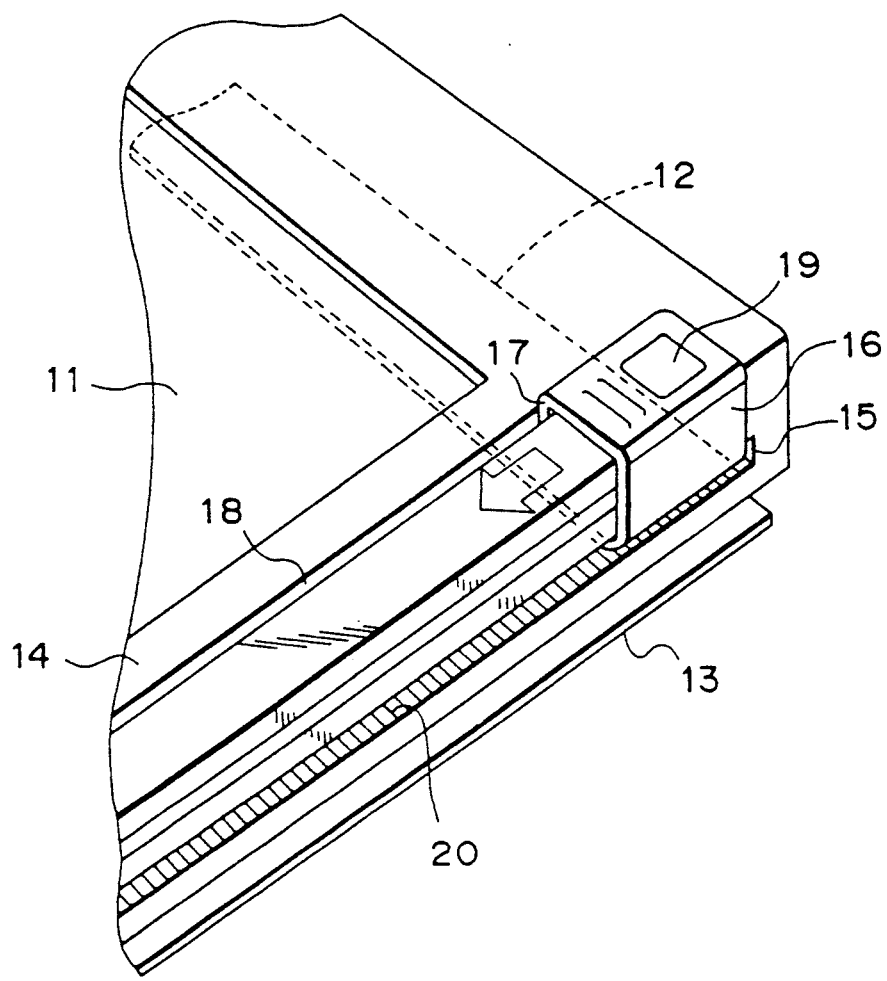
FIG. 2 is a partial perspective view of a thin transparent type display and an image inputting portion.

FIG. 2 is a partial perspective view of the above described thin transparent type display 11 and the image inputting portion 12. The above described image inputting portion 12 is disposed as follows on the reverse face of the thin transparent type display 11 with the use of the line scanners as often seen in a duplicator type scanner. Namely, a horizontally extending groove 15 is provided in a frame 14 on the side with the above described hinge pivoting around the above described hinge, from two frames extending in the scanning direction of the image inputting portion 12, frames for fixing the periphery of the thin transparent type display 11. Also, an approximately L-shaped scan lever 16 is provided at the above described one end of the image inputting portion 12 disposed vertically in the scanning direction with one end being inserted into the groove 15, the one end is coupled in the vertical direction to the above described one end of the image inputting portion 12. The bent portion 17 provided at the other end of the scan lever 16 is engaged for its free sliding operation with the scan guide 18 provided on the above described frame 14. The other side of the image inputting portion 12 is mounted for its free sliding operation on the frame 14' (see FIG. 1) on the above described hinge side.

The image inputting portion 12 is disposed for its free sliding operation along the reverse face of the thin transparent type display 11. The image inputting portion 12 can be slid by the sliding operation of the scan lever in an arrow mark direction with a finger being depressed against a slightly concave finger applying portion 19. Slits 20, 20, . . . for position detection use are disposed at equal intervals in a position opposite to the above described one end of the image inputting portion 12 in the above described groove 15.

Figure 3A:
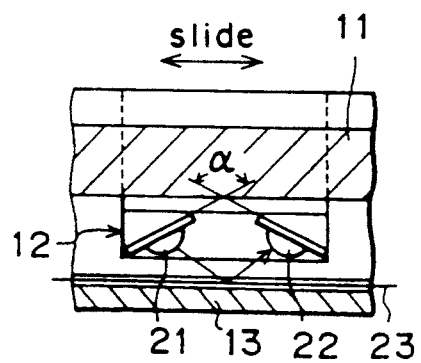
FIGS. 3(a) and 3(b) are detailed views of an image inputting portion.
Figure 3B:
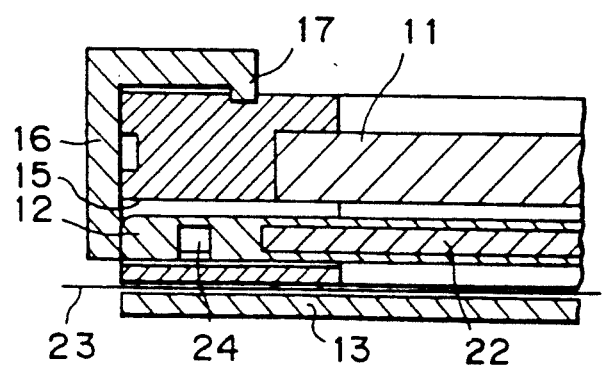

FIGS. 3(a) and 3(b) are detailed views of the above described image inputting portion 12. FIG. 3 (a) is a sectional view of the image inputting portion 12 mounted on the frame 14 as described hereinabove. FIG. 3 (b) is a vertical sectional view of the image inputting portion 12 mounted on the frame 14.

In FIG. 3 (a), a light source array 21 composed of an LED (light emitting diode) and so on, and an image sensor array 22 composed of a photoelectric converting element, a CCD (Charge Coupling Element) and so on are provided in the image inputting portion 12. The light source array 21 and the image sensor.array 22 are disposed across the full width of the document 23 along the longitudinal direction of the image inputting portion 12 and are formed a so-called line scanner, with the light emitting face of the light source array 21 and the light receiving face of the image sensor.array 22 being made opposite at a given angle α. The light radiated downwards from the light source array 21 is adapted to be reflected on the surfaces of the document 23 and be incident onto the light receiving face of the image sensor.array 22.

In FIG. 3 (b), a position detecting sensor 24 is mounted opposite to the slit 20 for position detecting use slit in a portion which is in the above described one end of the above described image inputting portion 12, and is within the groove 15 of the frame 14. The passing number of the slits 20 for the position detecting use caused through the movement of the image inputting portion 12 is counted in accordance with the light and darkness of the reflection light from the inner face of the groove 15 detected by the position detecting sensor 24 when the image inputting portion 12 has been slid towards the other end from one end of the groove 15. Thus, the position on the thin transparent type display 11 of the image inputting portion 12 is detected. The above described position detecting means is composed of a slit 20 for the above described position detection use and the position detecting sensor 24.

Figure 4:
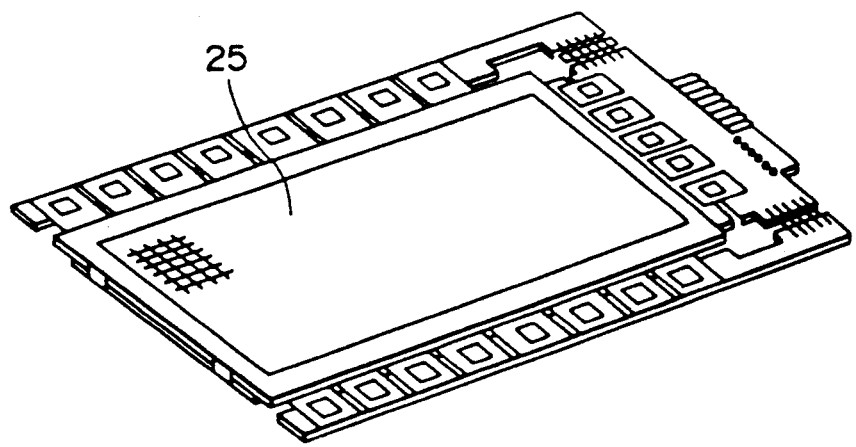
FIG. 4 is an outer appearance view of an LCD panel.

A thin transparent type display 11 in the present embodiment is composed of a liquid display (hereinafter referred to as LCD) whose outer appearance is shown in FIG. 4. The LCD panel 25 is composed so that a non-display picture element may become transparent without the use of the color filter.

Figure 5:
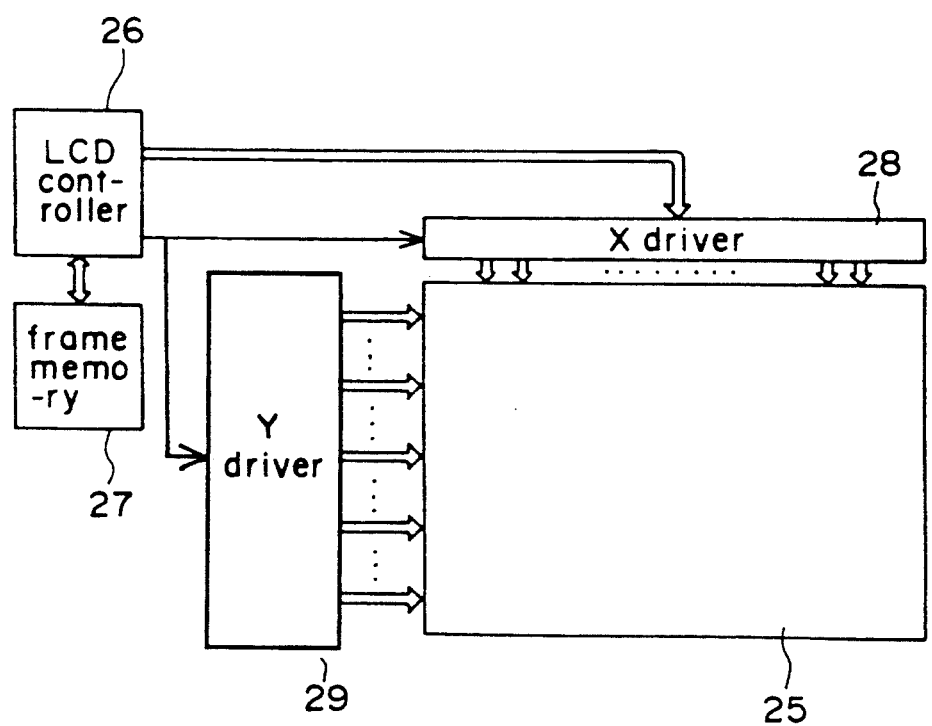
FIG. 5 is a block diagram of an LCD driving portion.

The above described LCD panel 25 is driven with such a LCD driving portion as shown in FIG. 5. A voltage corresponding to each picture element of the LCD panel 25 is retained in an X driver 28 when the digital image data of the one scanning line portion read from the frame memory 27 has been inputted into the X driver 28 under the control of the LCD controller 26. It is fed to each data line of the LCD panel 25. At this time when the scanning pulse has been applied upon the scanning line of the LCD panel 25 from the Y driver 29, the voltage corresponding to the digital image signal is stored in all the picture elements on the scanning line to display the picture elements.

The above described operation is sequentially performed with respect to all the scanning lines so as to display the images of one frame on the LCD panel 25.

Figure 6:
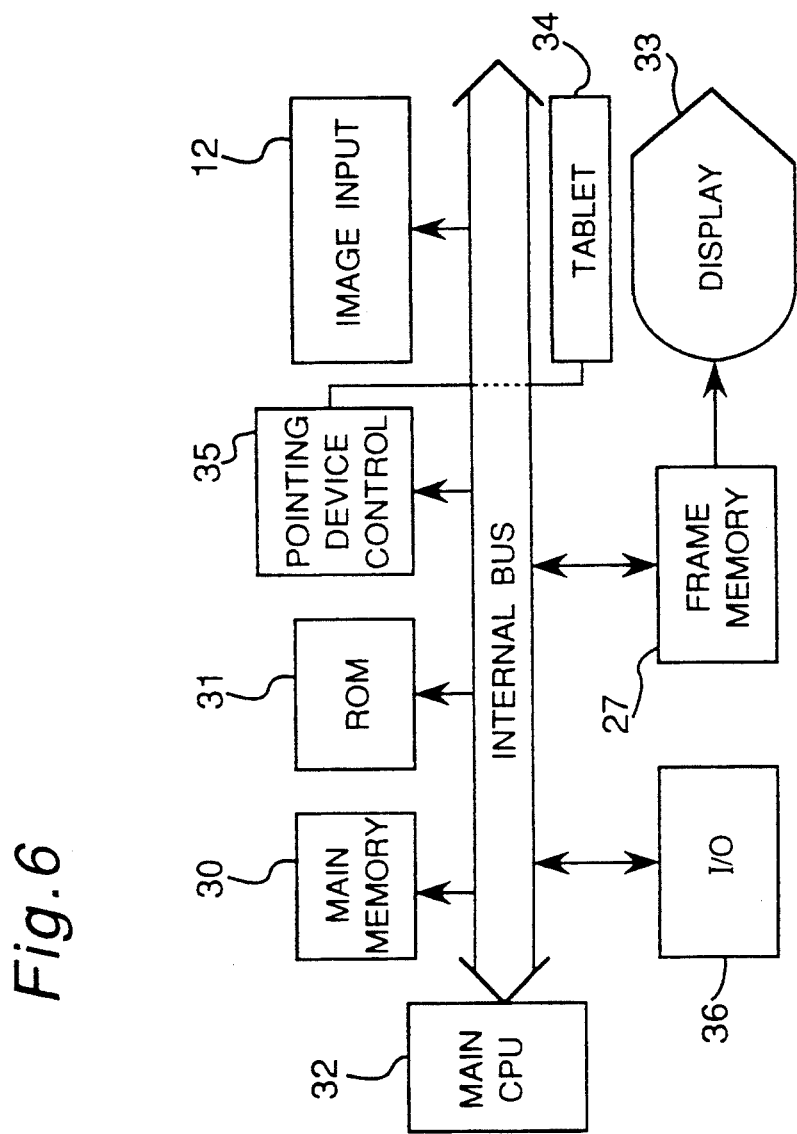
FIG. 6 is a schematic block diagram of the above described whole image inputting equipment.

FIG. 6 is a schematic block diagram of an entire image inputting equipment provided with the above described thin transparent type display 11 and the image inputting portion 12. The image inputting equipment has an image inputting portion 12 added to the normal microprocessor. system, with a function for handling the image being provided in each composing portion. A main memory 30 is composed of a DRAM (Dynamic.-Random.Access.Memory), a SRAM (Static Random-.Access.Memory), pseudoSRAM or the like, with the read digital image data, the digital image data after the various processing and so on being accommodated in it. The control program for the main CPU use 32, various parameters and so on are accommodated in the ROM (Read.Only.Memory). The display portion 33 is composed of the above described LCD panel 25 which is the thin transparent type display 11 and the above described LCD driving portion in the present embodiment. The bit map.data of the display portion in the display portion 33 obtained in accordance with the digital image data accommodated in the above described main memory 30 are accommodated in the frame memory 27. The image inputting portion 12 is composed of a light array 21 and an image sensor array 22 as described hereinabove. The image inputting portion 12 scans the document with a manual operation along the reverse face of the LCD panel 25 composing the display portion 33 as described hereinabove.

A pointing.device control portion 35 displays a position, specified by a tablet portion 34, on the display portion 33 or the like in accordance with the positional information from the tablet portion 34 composed of a tablet and stylus. An I/O (Input output interface) 36 is an interface to peripheral apparatuses such as communication apparatus and so on which are options.

An image inputting equipment of the above described construction reads a document to display it as follows. Open a thin transparent type display 11 composing the top cover of the above described image inputting equipment, and close the thin transparent type display 11 with a document 23 being put on the back cover 13. The document 23 is grasped among the frames 14, 14' of the thin transparent type display 11 and the back cover 13 as shown in FIG. 1. The image inputting portion 12 is positioned in one end portion of the thin transparent type display 11.

As shown in FIG. 3 (a), lights radiated from the light source array 21 accommodated in the picture image inputting portion 12 are reflected on the surfaces of the document 23 and become incident into the image sensor.array 22. The image signals showing the light and darkness of the reflection light from the document inputted into the image sensor.array 22 are converted into electric signals by the image sensor.array 22. The digital image data of the first one scanning line portion are obtained and are accommodated in the main memory 30. Simultaneously, the digital image data of one scanning line portion obtained at present by the positional information in accordance with the number ("0" in the first one scanning line) of the slits 20 for position detecting use detected by the positional detection sensor 24 is judged by a main CPU32 to be digital image data in accordance with the first one scanning line. The various processing of expansion, reduction or the like are applied by the main CPU32 upon the digital image data of the first one scanning line portion obtained, and are stored in the given address of the frame memory 27 in accordance with the above described position information.

Under the control of the above described main CPU32, the digital image data of one portion stored in the frame memory 27 at the present time by the LCD controller (see FIG. 5) is read with real time. In accordance with the above described position information, the display is effected in the position the same as that of the image inputting portion 12 in the LCD panel, which is a thin transparent type display 11 as in FIG. 1 through FIG. 3(b) and the display portion 33 in FIG. 6.

The image inputting portion 12 is slid in the arrow direction with a finger being pressed against the finger applying portion 19 of a scan lever 16 shown in FIG. 2. The number of the slits 20 for position detection use through the movement of the image inputting portion 12 is detected by the position detecting sensor 24 so that the position information of the image inputting portion 12 is obtained. The digital image data of the next one scanning-line portion is obtained by the image inputting portion 12 in synchronous relation with the obtained position information and is accommodated in the main memory 30. The digital image data of one scanning line portion with the various processing being applied on it are stored in the given address of the frame memory 27. The digital image data stored at present are read from the frame memory 27. The next one scanning line portion of image is displayed with real time in the same position as the position of the image inputting portion 12 in the LCD panel 25.

Figure 7:
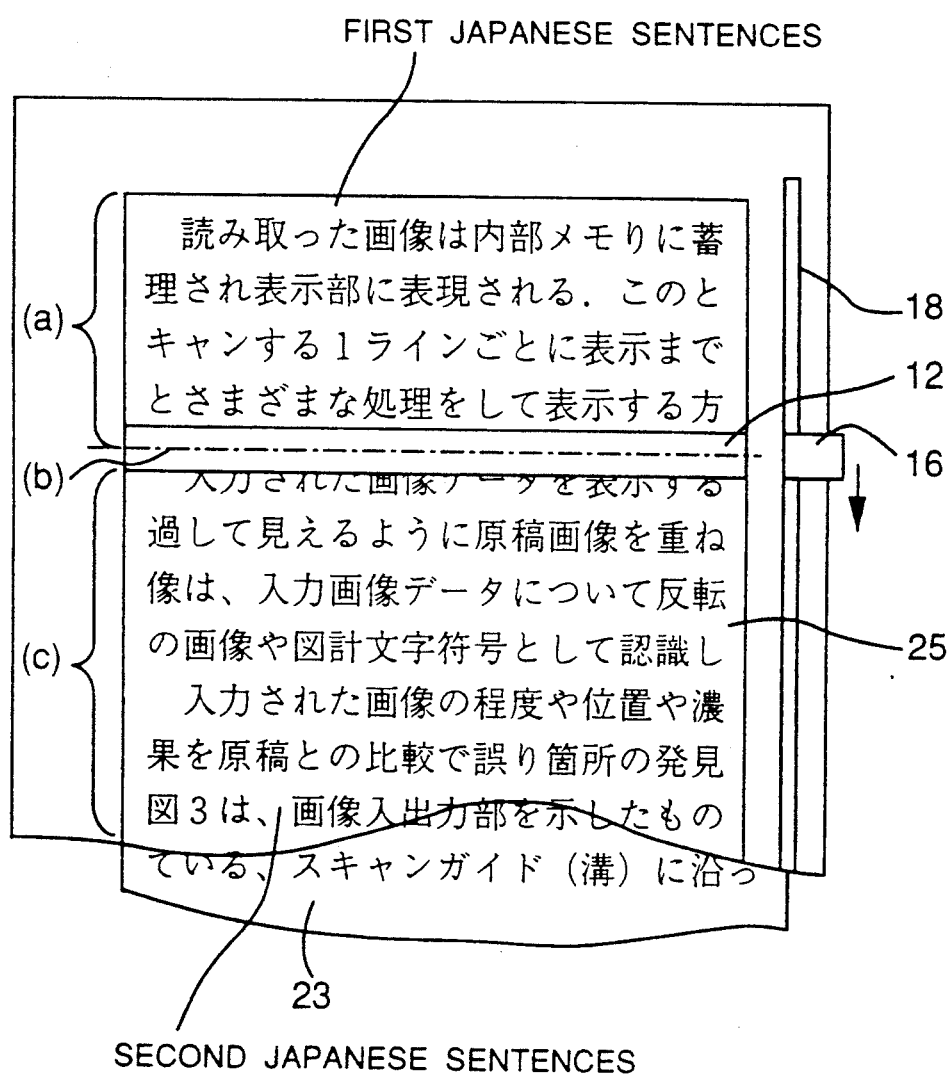
FIG. 7 is a view showing one embodiment of images obtained by the image inputting equipment shown in FIG. 1.

As the above described image inputting portion 12 slides in an arrow direction shown in FIG. 2, the above described operation is repeated. The image of the portion scanned already by the image inputting portion 12 on the document 23 is displayed on the portion the image inputting portion 12 on the LCD panel 25 already passed. As the LCD panel 25 is a thin transparent type as described hereinabove, the document 23 is seen through picture elements where the images in the LCD panel 25 are not displayed. As shown in FIG. 7, images (hereinafter, the read images displayed on the LCD panel 25 in this manner are called display images) are displayed through electric signals in a region (a) through which the image inputting portion 12 has already passed on the LCD panel 25, with a location of one scanning line (b) where the images are about to be read by the image inputting portion 12 being a boundary. On the other hand, the document 23 (hereinafter the images of the document directly seen through the transmission of the LCD panel 25 in this manner are called original images) are seen through the transmission of the region (c) through which the image inputting portion 23 has not passed yet.

The size of the display resolution and the display image is properly set with respect to the digital image data read by the above described image inputting portion 12, so that the display images and the original images can be superposed in the above described region (a). One sheet of document can be made with the display images of the region (a) and the original images of the region (c)

The display images to be displayed on the region (a) in the above described LCD panel 25 and the original images to be seen through the transmission of the region (c) can be seen simultaneously with the location of one scanning line (b) being a boundary, the document can be compared in real time with the reading images of the document. The resolution of the reading images, the emphasis of the edges, and the light and shade difference can be seen with in real time. For example, the resolution comparison and the light shade level adjustment can be effected by one image reading operation.

In the present embodiment, an image inputting portion 12 provided with a light source array 21, an image sensor . array 22 is arranged for its free sliding operation on the reverse face of the thin transparent type display 11 composed of an LCD panel 25 and so on. The images of the document 23 grasped among the frames 14, 14' of the thin transparent type display 11 and the back cover 13 are read by the sliding operation of the image inputting portion 21. The display images of the document 23 are displayed on the thin transparent type display 11 in accordance with the digital image data read in this manner. As shown in FIG. 7, the display images to be displayed on the region (a) and the original image seen through the transmission of the region (c) in the LCD panel 25 can be seen at the same time with location of one scanning line (b) as the boundary.

The document can be compared with real time in the read images of the document. For example, the resolution comparison and the light, shade level adjustment can be effected by one time of image reading operation.

In the above described embodiment, the images of the read document are adapted to be displayed on the LCD panel 25. By the addition of the various types of processing portions to the construction of the image inputting equipment shown in FIG. 6, the above described image inputting apparatus can be used as follows.

Figure 8:
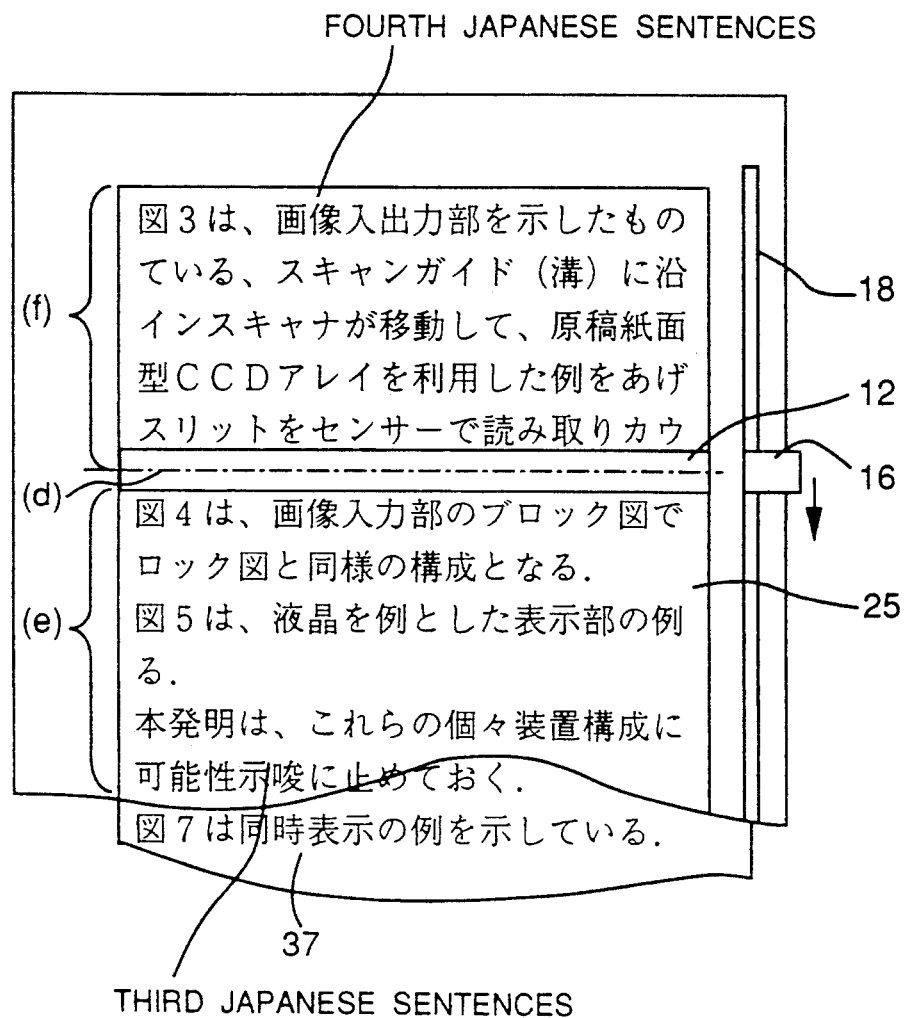
FIG. 8 is a view showing the other images different from those of FIG. 7.
Figure 9:
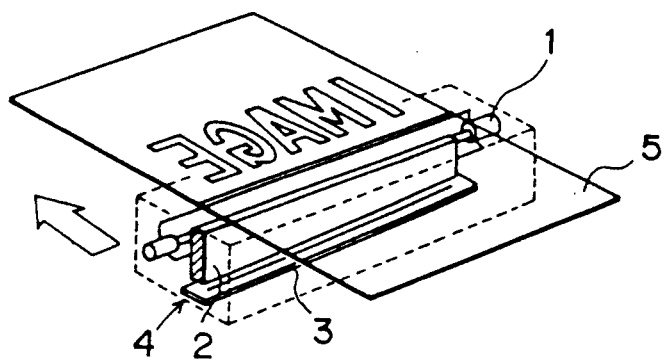
FIG. 9 is a perspective view of an image reading portion of the conventional duplicator type scanner.

An embodiment where a character recognition portion is added as one embodiment of the above described processing portion will be briefly described. In the case of this embodiment, images of the hand-written characters stored in the document are read by the image inputting portion 12. The deletion of one character and the character recognition processing are effected in the above described character recognition portion in accordance with the digital image data read in the following manner. The character recognition results on the document of the hand written characters read are displayed on the LCD panel 25 as in the above description in accordance with the character codes obtained as the result of the character recognition processing. As shown in FIG. 8, the images of the above described character recognition result are displayed in the region (f) through which the image inputting portion 12 has passed on the LCD panel 25 with the location of one running line (d) where the images of the hand-written characters at present are loaded by the image inputting portion 12 being provided as the boundary. On the other hand, the original images (namely, the hand-written characters on the document 37) of the document 37 are seen through the region (e) through which the image inputting portion 12 has not passed.

As the document 37 with the hand-written characters being stored can be compared with real time in the character recognition results on the document 37, the above described character recognition results can be checked/corrected in real time. Display with the display images to be displayed on the LCD panel 25 are shifted in position by a character height portion with respect to the original images, thus the hand-written character in one row and its recognition results are arranged for comparing operation.

A character recognition portion and a translation portion can be added as the above described processing portion. In this case, the characters of the sentences with source language described in the document are recognized in the character recognition portion. The recognition results are displayed on the LCD panel 25 as described hereinabove so as to effect the check/correction of the recognition results. The sentences of the source language stored in the main memory 3 are translated into the target language by the translation portion. The images of the translation sentences of the document are displayed in the LCD panel 25 in accordance with the character codes of the characters composing the translation sentences by the obtained target language in accordance with the character codes of the characters constituting the translation sentences with the obtained target language. The display images (translated sentences) and the original images (document) displayed on the LCD panel 25 are compared with each other so as to effect the check/correction of the translation results.

The sentences with the source language of the document, the recognition sentences (loading sentences), and the translation sentences can be compared in real time for each sentence. Improper locations of the character recognition results and the translation results may be easily checked, corrected. Even in this case, the processing of the resolution comparison and the light, shade adjustment of the display images and so on may be effected with real time.

A pattern recognition portion may be added as the above described processing portion. The line drawing, vector diagram and so on are recognized, can be handled as code date, and recognition diagrams can be displayed on the above described LCD panel 25. The difference between the original view and the recognition result (display view) is compared with in this manner and can be used for checks of the errors of the recognition result. In this case, the difference between the original view and the display view can be easily invented with the display images of the LCD panel 25 being provided as inversion display images or edge emphasis images. The inversion display method can be used even in the above described character recognition.

An image inputting equipment composed in display integral type can compare the display images with the original images directly with real time with the superposed display of the display images and the original images with the integral construction of the image inputting portion 12 and the display portion 33. Therefore, the image inputting equipment in the abovedescribed embodiment can be widely used with the combination of the various processing portions.

The construction in each embodiment is not restricted to a block diagram shown in FIG. 6. When the above described main memory 30 is capable of back up operation, or a nonvolatile memory, ROM31 may be substituted for the main memory 30. In the block diagram shown in FIG. 6, the image input portion 12 is added to the normal microprocessor system. As shown in the general microprocessor system, a plurality of microprocessors may be used.

In each of the above described embodiments, the thin transparent type display 11 is composed of a LCD panel 25. This invention is not restricted to it. For example, this invention may be composed of an electro.luminescence (EL) display.panel, plasma.display.panel and so on. The construction of the image inputting portion 12 is also not restricted to the construction shown in FIGS. 3(a) and 3(b).

In each of the above described embodiments, the scan lever 16 is slid with a finger being pressed against the finger applying portion 19 provided in the above described scan lever 16 so that the image inputting portion 12 may be manually slid. The invention is not restricted to it. For example, the sliding operation can be automatically effected with the specified location under the control of the pointing.device control portion 35 in accordance with the input from the tablet portion 34.

In each of the above described embodiments, as shown in FIG. 7, the display images of the document 23 are adapted to be displayed on the LCD panel 25 for each scanning line. The invention is not restricted to it. After the reading of the digital image data of one sheet portion of the document has been completed, contraction/expansion and so on are processed upon the read digital image data, the display image of one frame portion may be displayed at a time. Both the displaying methods may be properly switched and be used.

As is clear from the foregoing description, the image inputting equipment of the present invention scans the document by the sliding operation of the image inputting portion along the reverse face of the thin transparent type display so as to load the image information on the document. The images of the above described document are displayed so that the images of the document to be displayed on the above described thin transparent type display and the document corresponding to the images may be superposed visually by the image displaying means in accordance with the position on the thin transparent type display of the above described image inputting portion detected by the position detecting means.

Therefore, the comparison between the document and the images of the document may be effected in real time. Namely, the invention can check/correct the display images in real time in accordance with the image information read from the document.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In an image inputting equipment which includes an image inputting portion for scanning documents to read the image information on the documents, a thin transparent type display device having on one face thereof an image display means for displaying an image of the document on the thin transparent type display device in accordance with the image information on the document read by the image input portion, the improvement thereof comprising a position detecting means for detecting a position on the thin transparent type display device of the image inputting portion so as to output positional information, said image inputting portion disposed for free sliding operation along the reverse face of the thin transparent type display device and located between the thin transparent type display device and the document so as to illuminate and sense an image of the document which is disposed adjacent thereto, the image display means in response to the positional information outputted from the position detecting means and the image information read by the image inputting portion displaying an image of the document on the thin transparent type display device so as to enable the image and the document corresponding to the image to be visually superposed and compared in real time as said image inputting portion slides along said reverse face.

2. The image inputting equipment as defined in claim 1 further including a processing means responsive to said image information read by said image inputting portion and the position detected by said position detecting means for recognizing characters in a first language read by said inputting means and translating said characters to a second language.

3. An image inputting equipment comprising an image inputting portion for scanning documents to read the image information on the documents, a thin transparent type display device, an image display means for displaying an image of a scanned document on said thin transparent type display in accordance with the image information on the document read by the image inputting portion, and a position detecting means for detecting a position on the thin transparent type display device of the image input portion so as to output the positional information, the image inputting portion disposed for sliding operation along one face of the thin transparent type display device so as to illuminate and sense an image of the document, said image inputting portion disposed between said one face of the thin transparent type display device and the document, whereby the image displaying means displays the image of the document such that the image and said scanned document are visually superposed in accordance with the positional information outputted from the position detecting means and the image information read by the image inputting portion and a processing means responsive to said image information read by said image inputting portion and the position detected by said position detecting means for recognizing characters in a first font read by said inputting means and translating said characters to a second character font.

4. The image inputting equipment as defined in claim 3, including frames and a rear face cover wherein the document is grasped between the frames and the rear face cover and is scanned by the image inputting portion which is attached to and slid along said frames adjacent to the document and an image of the document is displayed on the thin transparent type display device.

5. The image inputting equipment as defined in claim 4, wherein the image of the document displayed on a region where the image inputting portion has been slid can be compared in real time with a portion of the document seen through said thin transparent display device.

6. The image inputting equipment as defined in claim 3 further including a memory means responsive to the image information read by said inputting portion and the position detected by said position detecting means for outputting image data for display on said thin transparent display device.

7. The image inputting equipment as defined in claim 3 further including a tablet-stylus means on said thin transparent display device and a control means for detecting a position on said display device indicated by said stylus.

* * * * *